United States Patent [19]
Thomas

[11] 4,420,074
[45] Dec. 13, 1983

[54] CONVEYORS

[75] Inventor: Eric R. Thomas, London, England

[73] Assignee: Molins Limited, London, England

[21] Appl. No.: 960,148

[22] Filed: Nov. 13, 1978

[30] Foreign Application Priority Data

Nov. 16, 1977 [GB] United Kingdom ............... 47622/77

[51] Int. Cl.³ .............................................. B65G 19/02
[52] U.S. Cl. .................................................... 198/128
[58] Field of Search ................ 198/728, 730, 731, 733

[56] References Cited

U.S. PATENT DOCUMENTS 970,464   9/1910  Caldwell ............................ 198/728
2,313,814 3/1943  Eisler ................................ 198/730 X

FOREIGN PATENT DOCUMENTS 976396 11/1964 United Kingdom ................ 198/728

Primary Examiner—E. R. Kazenske
Assistant Examiner—Douglas D. Watts
Attorney, Agent, or Firm—John C. Smith, Jr.

[57] ABSTRACT

A pusher conveyor has an endless chain or belt carried on two or more sprockets or other rotary members with parallel axes of rotation, pushers being secured to the chain or belt at regular intervals. The attachment of the pushers to the chain or belt is such that when each pusher is traveling along a straight working run of the chain or belt, a free end of the pusher projects through the plane containing the axes of the two rotary members at the ends of the working run, so that when a portion of the band carrying a pusher commences to move around the rotary member at the downstream end of the working run, the free end of the associated pusher reverses its movement to enter a complementary arcuate path.

14 Claims, 4 Drawing Figures

CONVEYORS

This invention relates to pusher conveyors, i.e. conveyors comprising one or more pushers secured to an endless chain or belt so disposed that the pusher or pushers can engage and propel articles along a supporting surface. Such a conveyor normally has a working run of the chain or belt extending parallel to the supporting surface along which the articles are propelled, and at the end of said working run the chain or belt travels around a supporting sprocket or pulley to a return run; as each pusher commences to travel round the sprocket or pulley, it necessarily rubs across the surface of the articles it has been pushing and with many articles this is undesirable. For example, if the article is a group of cigarettes wrapped in foil, but not yet enclosed in a packet, a pusher moving across the surface of the enclosing foil can seriously disturb its formation.

To avoid the above undesirable effect, the type of pusher conveyor known as a "tip-back" conveyor has been used; each pusher of a tip-back conveyor is movable relative to the chain or belt, being held in a fixed attitude relative to the chain or belt while traversing the working run and then being moved back relative to the chain or belt on reaching the end of the working run so that the pusher is clear of the article it has propelled as soon as it commences to travel round the sprocket or pulley. Commonly each pusher is pivotally secured to the chain or belt so that it can be tilted to provide the desired backward movement (i.e. movement in the opposite direction to that of the chain or belt). A tip-back conveyor is free of the undesirable effect mentioned above, but has its own disadvantages, in being a more complex and expensive structure and, in operation, generating appreciable noise.

It is an object of the present invention to provide an improved form of pusher conveyor, which avoids undesirable rubbing of a pusher across the surface of an article while not being unduly complex or noisy in operation.

According to the invention, a pusher conveyor comprises an endless flexible band, which may be a chain or a belt, carried on at least two rotary members having parallel axes of rotation and with pushers fixedly secured to and projecting from said band at regular intervals, said band having a working run extending straight between two of said rotary members, characterised in that each pusher is so formed and secured to an associated portion of the band that while that portion is travelling along the working run a free end of the pusher projects through the plane containing the axes of the two rotary members at the ends of the working run, and so that when said portion of the band commences to move in an arcuate path around the rotary member at the downstream end of the working run said free end of said one pusher reverses its movement to enter a complementary arcuate path.

The endless flexible band may be either a chain or a belt. It will be appreciated that the fact that the free end of each pusher projects beyond the plane of the axes of the rotary members means that, if there are only two rotary members and a plurality of pushers, the pushers secured to portions of the band traversing the working run are liable to be obstructed by pushers secured to portions of the band traversing the return run. This may be avoided by forming the pushers so that their potentially-interfering parts lie in different planes. Preferably, however, we provide more than two rotary members so that the return run is sub-divided, and so dispose the additional rotary member or members that the return run is well spaced from the working run.

In order that the invention may be well understood, preferred embodiments thereof will now be described, with reference to the accompanying drawings, in which.

Figure 1:
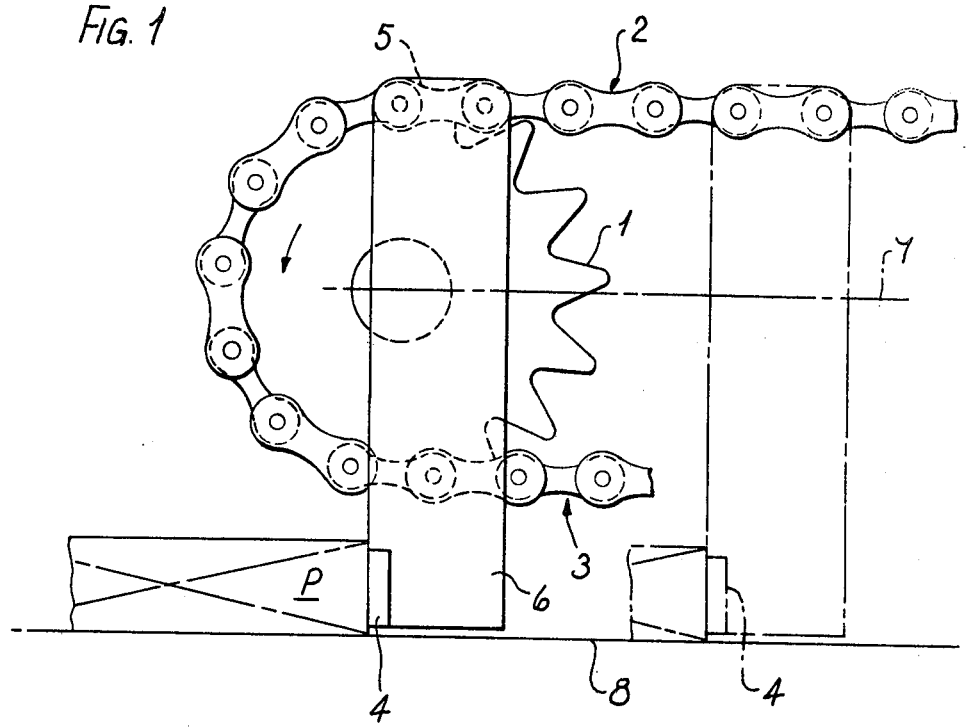
FIGS. 1 and 2 are views, in elevation, of the delivery end of a conveyor embodying the invention, the two views however showing movable parts in different positions.
Figure 2:
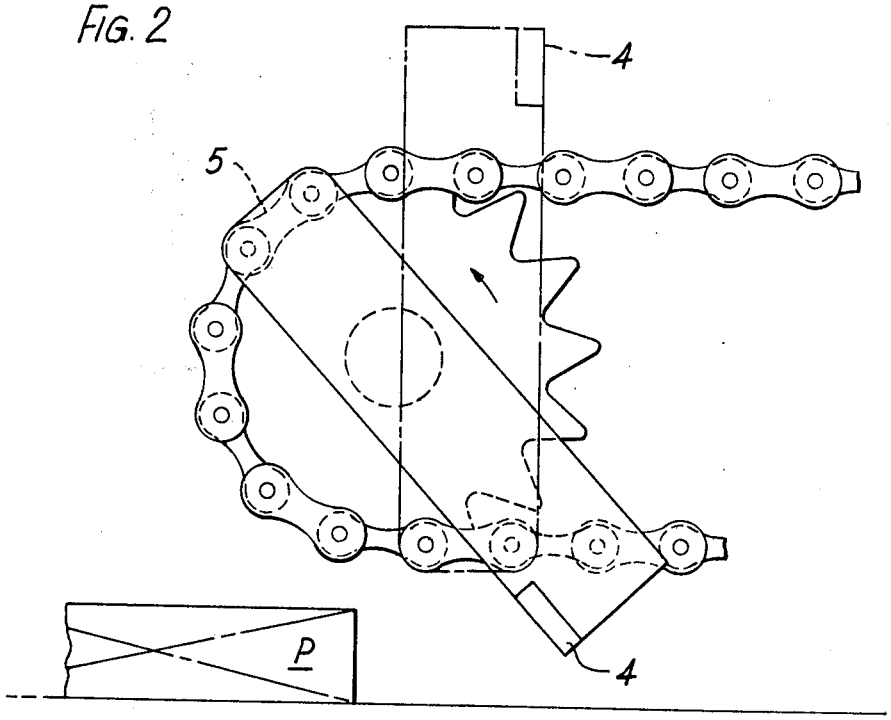

Referring first to FIGS. 1 and 2, a sprocket 1 serves as one of the supports for an endless roller chain having an upper (working) run 2 and a lower (return) run 3, both said runs extending horizontally to another similar sprocket (not shown). The chain carries a pusher 4 which is fixedly secured to a link 5 of the chain by a depending support 6 which is of such length that, while the link 5 is in the upper (working) run of the chain, the pusher 4 is at a lower level than the horizontal plane 7 containing the axis of the sprocket 1 and of the other sprocket (not shown) and just above a horizontal surface 8 of a support member, along which surface the conveyor is required to propel part-formed cigarette packets P.

Two positions of the pusher 4 are shown in FIG. 1; as drawn in chain-dot line, the link 5 is in the upper (working) run 2 of the chain and is moving towards the sprocket 1, so that pusher 4 is in a corresponding position above surface 8. As shown in full line, the link 5 has reached the sprocket 1 and is about to move out of alignment with the upper run 2 and commence moving in an arcuate path around the sprocket; the sprocket is rotated at constant speed in an anti-clockwise direction, so the pusher 4 moves at constant speed to the left across the surface 8 until it reaches the position shown in full line. Immediately after this, however, the link 5 commences to move round the perimeter of the sprocket as the latter continues to rotate, so that the link 5 tilts and the pusher 4, in consequence, also moves to the right and upwards along an arc centred on the sprocket axis, soon reaching the position shown in full line in FIG. 2.

Thus at the position shown in full line in FIG. 1, the direction of movement of the pusher 4 reverses instantaneously, (subject to any distortion of the structure in response to inertia forces) so that the pusher 4 moves immediately clear of the packet P.

The pusher 4 travels along the circular arc while the sprocket 1 makes one half-revolution; the pusher 4 is then in the position shown in chain-dot line in FIG. 2 and the link 5, as the sprocket 1 continues to rotate, thereafter travels along the return run 3 of the chain, so that the pusher 4 moves horizontally to the right.

It will be appreciated that in the arrangement shown in FIGS. 1 and 2, only one pusher 4 can be fitted to the chain as if two or more pushers were provided, a pusher secured to a link travelling along the upper run of the chain would collide with a pusher secured to a link travelling along the lower run.

Figure 3:
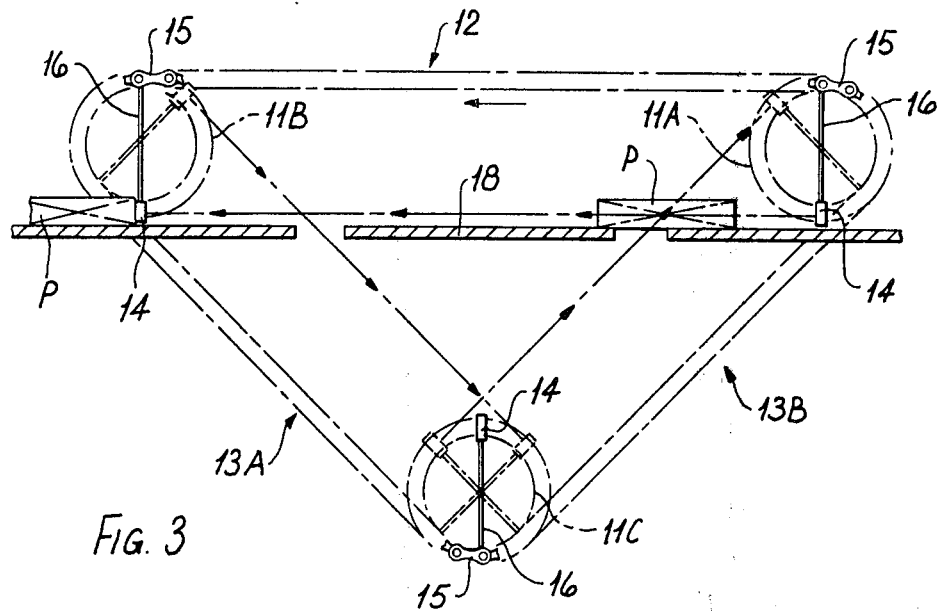
FIG. 3 is a diagrammatic elevation of an alternative layout of a conveyor also embodying the invention.

A preferred arrangement of a conveyor embodying the invention and having a plurality of pushers is diagrammatically illustrated in FIG. 3. In this arrangement three sprockets 11A, 11B, 11C are provided, carrying an endless chain having a horizontal working run 12 between sprocket 11A and sprocket 11B, and a return run divided into two inclined portions 13A, 13B, between which the chain passes round the sprocket 11C. The inclined portions of the return run are each at 45° to the horizontal, and they are at rightangles to one another. Hence the chain wraps round each of the sprockets 11A, 11B so as to occupy 135° of its perimeter, and round the sprocket 11C for 90°. Pushers 14 are fitted by supports 16 to links 15 of the chain at regular intervals (as shown in full line) to propel packets P over a support surface 18, it will be appreciated that a plurality of pushers 14 can be provided, subject to a minimum spacing between adjacent pushers so that the successive pushers do not collide as they pass the sprockets. (Various positions of the pushers, around the sprockets, are shown in broken line). The minimum spacing in any particular layout can readily be deduced from the geometry, the critical point being of course the sprocket or sprockets around which the chain wraps for the greatest proportion of its circumference (assuming all sprockets are of the same diameter).

Figure 4:
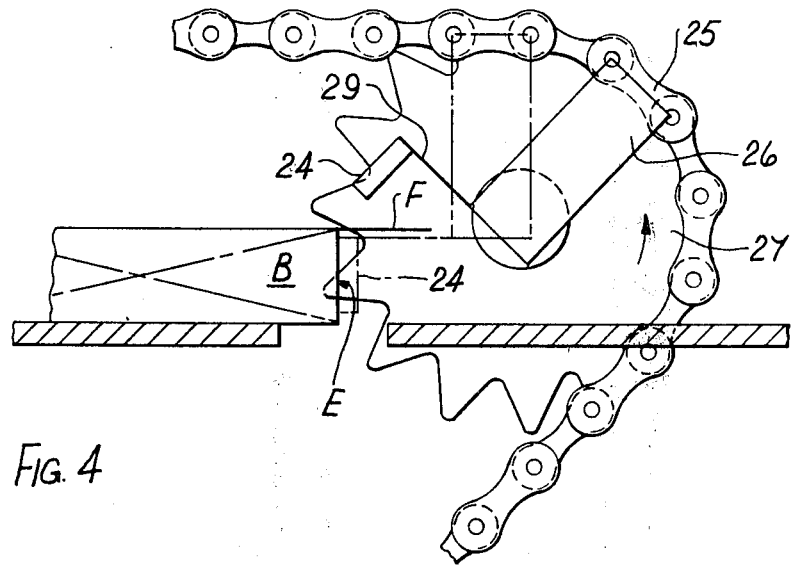
FIG. 4 is a view in elevation of the "upstream" end of a conveyor embodying the invention, having dual-purpose pushers.

From FIG. 3, it will be noted that each pusher 14, as it passes the sprocket 11A and its link 15 enters the working run 12 of the chain, follows a path which is a circular arc ending in a line along which it will pass over the support surface 18, but moving in the opposite direction, until it instantaneously reverses when its support 16 reaches the vertical (i.e. when link 15 is leaving the sprocket 11A). This motion can be useful; e.g. if a conveyor embodying the invention is to propel "bundles" of cigarettes each comprising a selected number of cigarettes, in a desired formation and partly wrapped in foil, the pusher 14 may be utilised to assist in completing the tucking of the foil. In FIG. 4 there is shown a slightly modified arrangement for this purpose; only one sprocket 21, corresponding to sprocket 11A of FIG. 3, and adjacent parts are shown. Each pusher 24 is again secured to a link 25 by a support 26, but in this case the pusher 24 is offset forwards (relative to the chain movement) by an arm 29 connecting the pusher 24 to the support 26. A foil-wrapped bundle B of cigarettes, to be propelled by the pusher 24, still has a projecting flap F of foil which is to be folded down against the end face E of the bundle B against which the pusher 24 is to engage. It can readily be seen that the pusher 24 will move from the position shown in full line to the position shown in chain-dot line as the sprocket 21 rotates anti-clockwise and that as the pusher 24 so moves, it will engage the flap F and fold it against the face E, before commencing to push the bundle B to the left.

Various changes may be made in the apparatus described above without departing from the scope of the invention. Notably, the sprocket at the upstream end of the working run of the band may be of such a size that the pusher does not project past its centre while the portion of the chain to which it is attached is passing round that sprocket. The free end of the pusher does not then project through the plane of the sprocket axes for the whole of its travel along the working run, but provided this condition is met as the pusher reaches the downstream end, the instantaneous reversal of the pusher is achieved. Such an arrangement may if desired be operated in reverse to produce said reversal at the upstream end only.

I claim:

1. A pusher conveyor comprising an endless flexible band, carried on at least two rotary members having parallel axes of rotation and with pushers fixedly secured to and projecting from said band at regular intervals, the free end of each of said pushers including a pusher surface, said band having a working run extending straight between two of said rotary members, characterized in that each pusher is so formed and secured to an associated portion of the band that while each portion is traveling along the working run each said pusher projects through and beyond a plane containing the axes of said two rotary members at the ends of the working run with said pusher surface located entirely on the side of said plane opposite said working run of said band and spaced from said plane, and so that when each said portion of the band commences to move in an arcuate path around the rotary member at the downstream end of the working run said pusher surface reverses its movement to enter a complementary arcuate path.

2. A conveyor as claimed in claim 1, in which the band is a roller chain and the rotary members are sprockets.

3. A conveyor as claimed in claim 2, including more than two rotary members, the additional rotary member or members being so disposed that the band has a subdivided return run which is spaced from the working run.

4. A conveyor as claimed in claim 3, including three rotary members, the working run of the band extending from a first to a second of said rotary members and the third rotary member being spaced from the working run and on the far side of said plane so that the band has a return run divided into two portions both diverging from the working run towards the third rotary member.

5. A conveyor as claimed in claim 1, in which each pusher comprises a support member projecting normal to the band.

6. A conveyor as claimed in claim 5, in which each pusher further comprises an arm secured to and at rightangles to the support member, said pusher surface being positioned at the free end of said arm.

7. A pusher conveyor comprising:
(a) at least two rotary members spaced from each other and having substantially parallel axes of rotation;
(b) an endless flexible band extending between and arranged to pass over said rotary members, one run thereof constituting a working run extending between two of said rotary members, the axes of said two rotary members defining a first plane and said working run of said flexible band defining a second plane spaced from one side of said first plane;
(c) means providing a surface for supporting a succession of articles and defining a third plane spaced from the other side of said first plane opposite said second plane; and
(d) a plurality of pusher means projecting from said band at regular intervals, each pusher means being so formed and secured to an associated portion of said band that when said portion is located along said working run thereof said pusher means projects transversely from said second plane through said first plane towards said third plane and adjacent said article supporting surface, a portion of said pusher means adjacent said article supporting surface including a pusher surface, the entire pusher surface being located between said first and third planes and spaced from said first plane when said associated portion of said band passes along said working run for contacting and pushing an article along said supporting surface;

(e) whereby when said portion of said band commences to move in an arcuate path around the rotary member at the downstream end of said working run, said portion of said pusher means adjacent said supporting surface, and including the entirety of said pusher surface, reverses its movement to disengage said article on said supporting surface and to enter a complementary arcuate path.

8. A conveyor as claimed in claim 7 wherein said second and third planes of said working run and said article supporting surface respectively are substantially parallel.

9. A conveyor as claimed in claim 8 wherein said first plane of said axes of said two rotary members is substantially parallel to said second and third planes of said working run and said article supporting surface respectively.

10. A conveyor as claimed in claim 7 wherein said rotary members are sprockets and said band is a chain.

11. A conveyor as claimed in claim 7 comprising at least three rotary members, the at least one rotary member in addition to said two rotary members being so disposed that said band has a subdivided return run which is spaced from said working run.

12. A conveyor as claimed in claim 11 comprising three rotary members, said working run of said band extending from a first to a second of said rotary members and the third rotary member being spaced from said working run and from said other side of said first plane whereby said band has a return run divided into two portions both diverging from said working run towards said third rotary member.

13. A conveyor as claimed in claim 7 wherein each of said pusher means comprises a support secured to and projecting normal to said band, said pusher surface being positioned on said support.

14. A conveyor as claimed in claim 13 wherein each of said pusher means further comprises an arm, one end of which is connected at right angles to said support, said pusher surface being located at the opposite end of said arm.

* * * * *